United States Patent
Das Sarma et al.

(10) Patent No.: US 9,858,313 B2
(45) Date of Patent: Jan. 2, 2018

(54) METHOD AND SYSTEM FOR GENERATING QUERY-RELATED SUGGESTIONS

(75) Inventors: Anish Das Sarma, San Francisco, CA (US); Alpa Jain, Mountain View, CA (US)

(73) Assignee: Excalibur IP, LLC, New York, NY (US)

( * ) Notice: Subject to any disclaimer, the term of this patent is extended or adjusted under 35 U.S.C. 154(b) by 0 days.

(21) Appl. No.: 13/335,692

(22) Filed: Dec. 22, 2011

(65) Prior Publication Data

US 2013/0166585 A1 Jun. 27, 2013

(51) Int. Cl.
*G06F 17/30* (2006.01)

(52) U.S. Cl.
CPC .... *G06F 17/30389* (2013.01); *G06F 17/3064* (2013.01); *G06F 17/3097* (2013.01); *G06F 17/30672* (2013.01); *G06F 17/30864* (2013.01); *G06F 17/30867* (2013.01)

(58) Field of Classification Search
CPC .......... G06F 17/3064; G06F 17/30864; G06F 17/30867; G06F 17/3097; G06F 17/30672
USPC .. 707/1, 3, 5, 767, 705, 706, 708, 723, 732, 707/754, 758, 766, 771
See application file for complete search history.

(56) References Cited

U.S. PATENT DOCUMENTS

| | | | |
|---|---|---|---|
| 6,834,075 B2 | 12/2004 | Wang | |
| 7,570,943 B2 | 8/2009 | Sorvari et al. | |
| 7,676,460 B2 * | 3/2010 | Morgan | 707/999.004 |
| 7,743,047 B2 | 6/2010 | White et al. | |
| 7,774,339 B2 | 8/2010 | White et al. | |
| 7,792,821 B2 * | 9/2010 | Shakib et al. | 707/714 |
| 7,962,463 B2 | 6/2011 | Cava | |
| 7,996,400 B2 | 8/2011 | Morris et al. | |
| 8,065,316 B1 | 11/2011 | Baker | |
| 8,095,568 B2 | 1/2012 | Nordahl | |
| 8,117,208 B2 * | 2/2012 | Chang et al. | 707/748 |
| 8,122,011 B1 * | 2/2012 | Garg et al. | 707/721 |
| 8,171,021 B2 * | 5/2012 | Guha | G06F 17/30864 707/723 |
| 8,176,069 B2 * | 5/2012 | Timm | G06F 17/3064 707/767 |
| 8,180,790 B2 * | 5/2012 | Sareen et al. | 707/767 |
| 8,239,461 B2 | 8/2012 | Jones et al. | |
| 8,275,759 B2 * | 9/2012 | Imig et al. | 707/706 |
| 8,352,465 B1 | 1/2013 | Jing et al. | |
| 8,429,184 B2 * | 4/2013 | Ismalon | G06F 17/3064 707/713 |
| 8,538,982 B2 * | 9/2013 | Effrat | G06F 17/3064 707/723 |
| 8,572,100 B2 | 10/2013 | Hamilton | |
| 8,583,675 B1 * | 11/2013 | Haahr et al. | 707/767 |
| 8,589,395 B2 | 11/2013 | Singh | |
| 8,589,429 B1 | 11/2013 | Thirumalai et al. | |

(Continued)

OTHER PUBLICATIONS

Liu, Y., et al., "How do users describe their information need: Query recommendation based on snippet click model", in Expert System with Applications, 2011, 10 pages.

(Continued)

*Primary Examiner* — Dangelino Gortayo
(74) *Attorney, Agent, or Firm* — Berkeley Law & Technology Group, LLP

(57) ABSTRACT

Methods and systems are provided that may be utilized to determine one or more suggestions of entities relating to a user query.

16 Claims, 5 Drawing Sheets

(56) References Cited

U.S. PATENT DOCUMENTS

| | | | |
|---|---|---|---|
| 8,606,786 B2* | 12/2013 | Rounthwaite et al. | 707/737 |
| 8,694,483 B2 | 4/2014 | Roulland et al. | |
| 8,756,219 B2* | 6/2014 | Chand et al. | 707/721 |
| 8,983,996 B2 | 3/2015 | Lai et al. | |
| 9,177,057 B2* | 11/2015 | Vadlamani | G06F 17/30864 |
| 9,672,288 B2 | 6/2017 | Wu | |
| 2004/0205449 A1 | 10/2004 | Hayes | |
| 2005/0125427 A1 | 6/2005 | Dageville et al. | |
| 2006/0112087 A1 | 5/2006 | Smyth et al. | |
| 2006/0242138 A1 | 10/2006 | Brill et al. | |
| 2007/0208691 A1 | 9/2007 | Ramakrishnasn | |
| 2007/0266002 A1 | 11/2007 | Chowdhury et al. | |
| 2008/0027932 A1 | 1/2008 | Brunner et al. | |
| 2008/0243733 A1 | 10/2008 | Black | |
| 2008/0256061 A1 | 10/2008 | Chang | |
| 2008/0270356 A1 | 10/2008 | Anderson et al. | |
| 2008/0281817 A1 | 11/2008 | White et al. | |
| 2008/0294686 A1 | 11/2008 | Long et al. | |
| 2008/0306937 A1 | 12/2008 | White et al. | |
| 2009/0006333 A1 | 1/2009 | Jones et al. | |
| 2009/0030876 A1 | 1/2009 | Hamilton | |
| 2009/0106224 A1 | 4/2009 | Roulland et al. | |
| 2009/0171929 A1* | 7/2009 | Jing | G06F 17/3064 707/999.005 |
| 2009/0248661 A1 | 10/2009 | Bilenko et al. | |
| 2009/0259632 A1 | 10/2009 | Singh | |
| 2009/0265341 A1 | 10/2009 | Nordahl | |
| 2009/0281973 A1 | 11/2009 | Selinger et al. | |
| 2009/0319466 A1 | 12/2009 | Liu et al. | |
| 2010/0094862 A1 | 4/2010 | Bent et al. | |
| 2010/0306229 A1 | 12/2010 | Timm et al. | |
| 2010/0306937 A1 | 12/2010 | Timm et al. | |
| 2011/0093488 A1* | 4/2011 | Amacker et al. | 707/767 |
| 2011/0106799 A1 | 5/2011 | Barkai et al. | |
| 2011/0153528 A1* | 6/2011 | Bailey et al. | 706/12 |
| 2011/0191364 A1* | 8/2011 | LeBeau et al. | 707/767 |
| 2011/0202522 A1 | 8/2011 | Ciemiewicz et al. | |
| 2011/0258148 A1 | 10/2011 | Gao | |
| 2011/0264673 A1 | 10/2011 | White et al. | |
| 2011/0289068 A1 | 11/2011 | Teevan et al. | |
| 2011/0307320 A1 | 12/2011 | Tagney et al. | |
| 2012/0036123 A1 | 2/2012 | Hasan et al. | |
| 2012/0047145 A1* | 2/2012 | Heidasch | 707/741 |
| 2012/0166438 A1 | 6/2012 | Wu et al. | |
| 2012/0174158 A1 | 7/2012 | Mowrey et al. | |
| 2012/0185507 A1* | 7/2012 | Paparizos | G06F 17/30401 707/774 |
| 2012/0203717 A1 | 8/2012 | Xu | |
| 2012/0259851 A1 | 10/2012 | Holmes et al. | |
| 2012/0260185 A1 | 10/2012 | Choc et al. | |
| 2012/0265779 A1* | 10/2012 | Hsu et al. | 707/767 |
| 2012/0284293 A1* | 11/2012 | Nierenberg | G06F 17/30654 707/766 |
| 2012/0323828 A1 | 12/2012 | Sontag | |
| 2013/0046777 A1* | 2/2013 | Mohiuddin et al. | 707/767 |

OTHER PUBLICATIONS

Bilenko, M., et al., "Mining the Search Trails of Surfing Crowds: Identifying Relevant Websites from User Activity", WWW 2008, Apr. 21-25, 2008, Beijing, China, 10 pages.

Hopfgarner et al., "Search Trails using User Feedback to Improve Video Search", ACM, MM'08, Oct. 26-31, 2008, Vancouver, Canada, 2008, 10 Pages.

White, R.W. et al., "Assessing the Scenic Route: Measuring the Value of Search Trails in Web Logs", SIGIR'10, Jul. 19-23, 2010, Geneva, Switzerland, 8 pages.

White, R.W., et al., "Leveraging Popular Destinations to Enhance Web Search Interaction", ACM Transactions on the Web, vol. 2, No. 3, Article 16, Publication Date: Jul. 2008, 30 Pages.

Bailey et al., "Mining Historic Query Trails to Label Long and Rare Search Engine Queries", ACM Transaction on the Web, vol. 4, No. 4, Article 15, Sep. 2010, 27 Pages.

Singla et al., "Studying Trailfinding Algorithms for Enhanced Web Search", ACM, SIGIR' 10, Jul. 19-23, 2010, Genava, Switzerland, pp. 443-450 (8 pages).

Bruza et al., "Interactive Internet Search, Keyword, Directory and Query Reformulation Mechanism Compared", ACM, SIGIR 2000, Athens, Greece, 2000, pp. 280-287 (8 pages).

L. Suganya, et al., "Efficient Semantic Similarity Based FCM for Inferring User Search Goals with Feedback Sessions", International Journal of Computer Trends and Technology (IJCTT) vol. 4, Issue 9, Sep. 2013, 6 pages).

Bonchi, Francesco, et al., "Topical Query Decomposition" KDD '08, Aug. 24-27, 2008, Las Vegas, Nevada, USA, pp. 52-60.

Yu, Cong et al., "It Takes Variety to Make a World: Diversification in Recommender Systems", ACM. EDBT 2009, Mar. 24-26, 2009, Saint Petersburg, Russia, 11 pages.

Stoyanovich, Julia et al., "Making Interval-Based Clustering Rank-Aware", ACM. EDBT 2011, Mar. 22-24, 2011, Uppsala, Sweden, 12 pages.

Jain, Alpa et al., "Identifying Comparable Entities on the Web", ACM. CIKM '09, Nov. 2-6, 2009, Hong Kong, China, 4 pages.

Borzsonyi, Stephan et al., "The Skyline Operator", Paper #235, German National Research Foundation, 20 pages.

Boim, Rubi et al., "DiRec: Diversified Recommendations for Semantic-less Collaborative Filtering", School of Computer Science, Tel-Aviv University, Israel, 4 pages.

Adomavicius, Gediminas and Tuzhilin, Alexander., "Towards the Next Generation of Recommender Systems: A Survey of the State-of-the-Art and Possible Extensions", 43 pages.

Chen, Zhiyuan and Li, Tao, "Addressing Diverse User Preferences in SQL-Query-Result Navigation", ACM, SIGMOD'07, Jun. 11-14, 2007, Beijing, china, 12 pages.

U.S. Appl. No. 13/286,204, filed Oct. 31, 2011, 71 pages.

U.S. Appl. No. 13/286,204: Notice to file missing parts and filing receipt, dated Nov. 16, 2011, 5 pages.

U.S. Appl. No. 13/286,204: Response to notice to file missing parts, dated Jun. 8, 2012, 9 pages.

U.S. Appl. No. 13/286,204: Filing receipt, dated Jun. 15, 2012, 3 pages.

U.S. Appl. No. 13/286,204: Non-Final Rejection, dated Nov. 20, 2012, 20 pages.

U.S. Appl. No. 13/286,204: Non-Final Office Action response, dated Mar. 19, 2013.

U.S. Appl. No. 13/286,204: Notice of publication, dated May 2, 2013, 1 page.

U.S. Appl. No. 13/286,204: Final Office action, dated May 6, 2013, 24 pages.

U.S. Appl. No. 13/286,204: Response to Final Office Action, dated Jul. 8, 2013, 15 pages.

U.S. Appl. No. 13/286,204: Advisory Action and Rule 312 amendment, dated Jul. 15, 2013, 18 pages.

U.S. Appl. No. 13/286,204: Request for Continued Examination, dated Aug. 6, 2013, 17 pages.

U.S. Appl. No. 13/286,204: Non-Final Office Action, dated May 16, 2014, 18 pages.

U.S. Appl. No. 13/286,204: Response to Non-Final Office Action, dated Aug. 18, 2014, 14 pages.

U.S. Appl. No. 13/286,204: Examiner initiated interview summary, dated Oct. 31, 2014, 2 pages.

U.S. Appl. No. 13/286,204: Notice of Allowance and Fees, dated Nov. 10, 2014, 17 pages.

U.S. Appl. No. 13/286,204: Issue Fee Payment, dated Feb. 4, 2015, 1 page.

U.S. Appl. No. 13/286,204: Issue Notification, dated Feb. 25, 2015, 1 page.

U.S. Appl. No. 14/144,250, filed Dec. 30, 2013, 58 pages.

U.S. Appl. No. 14/144,250: Filing receipt and Notice to File Missing Parts, dated Jan. 15, 2014, 5 pages.

U.S. Appl. No. 14/144,250: Response to Notice to File Missing Parts, dated Feb. 4, 2014, 7 pages.

U.S. Appl. No. 14/144,250: Updated Filing Receipt, dated Feb. 11, 2014, 3 pages.

U.S. Appl. No. 14/144,250: Notice of Publication, dated Jul. 2, 2015, 1 page.

(56) References Cited

OTHER PUBLICATIONS

U.S. Appl. No. 14/144,250: Non-Final Rejection and Examiner Search, dated Aug. 28, 2015, 29 pages.
U.S. Appl. No. 14/144,250: Amendment/Req. Reconsideration-After Non-Final Reject, dated Nov. 30, 2015, 14 pages.
U.S. Appl. No. 14/144,250: Final Rejection, dated Mar. 9, 2016, 16 pages.
U.S. Appl. No. 14/144,250: After Final Consideration Program Request, dated May 9, 2016, 15 pages.
U.S. Appl. No. 14/144,250: Advisory Action, dated Jun. 1, 2016, 7 pages.
U.S. Appl. No. 14/144,250: RCE and Amendment, dated Jul. 11, 2016, 16 pages.
U.S. Appl. No. 14/144,250: Notice of Allowance and Fees, dated Feb. 10, 2017, 18 pages.
U.S. Appl. No. 14/144,250: Issue Notification, dated May 17, 2017, 1 page.

\* cited by examiner

METHOD AND SYSTEM FOR GENERATING QUERY-RELATED SUGGESTIONS

BACKGROUND

1. Field

The subject matter disclosed herein relates to a method or system for generating query-related suggestions.

2. Information

A search engine may be used perform one or more research-oriented tasks such as, for example, locating, comparing or selecting products, travel destinations, or restaurants. For example, a user may search for a coffee shop located within a certain geographical area, such as within a zip code, town, or near a landmark. A search engine may be used determine relevant documents or websites, for example, corresponding to a user query. Likewise, typically, state of the art search engines may also generate query-related suggestions to assist in conducting searches. For example, if a user has searched for a coffee shop located on Main Street in Palo Alto, a search engine may determine that a Starbucks™ is located on Main Street and may provide a link to the Starbucks™ in search results. A search engine may also identify other coffee shops located on nearby streets in Palo Alto.

Search engines continue to strive to provide results relevant to a query, including providing query-related suggestions so that users may find results of interest with little effort.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
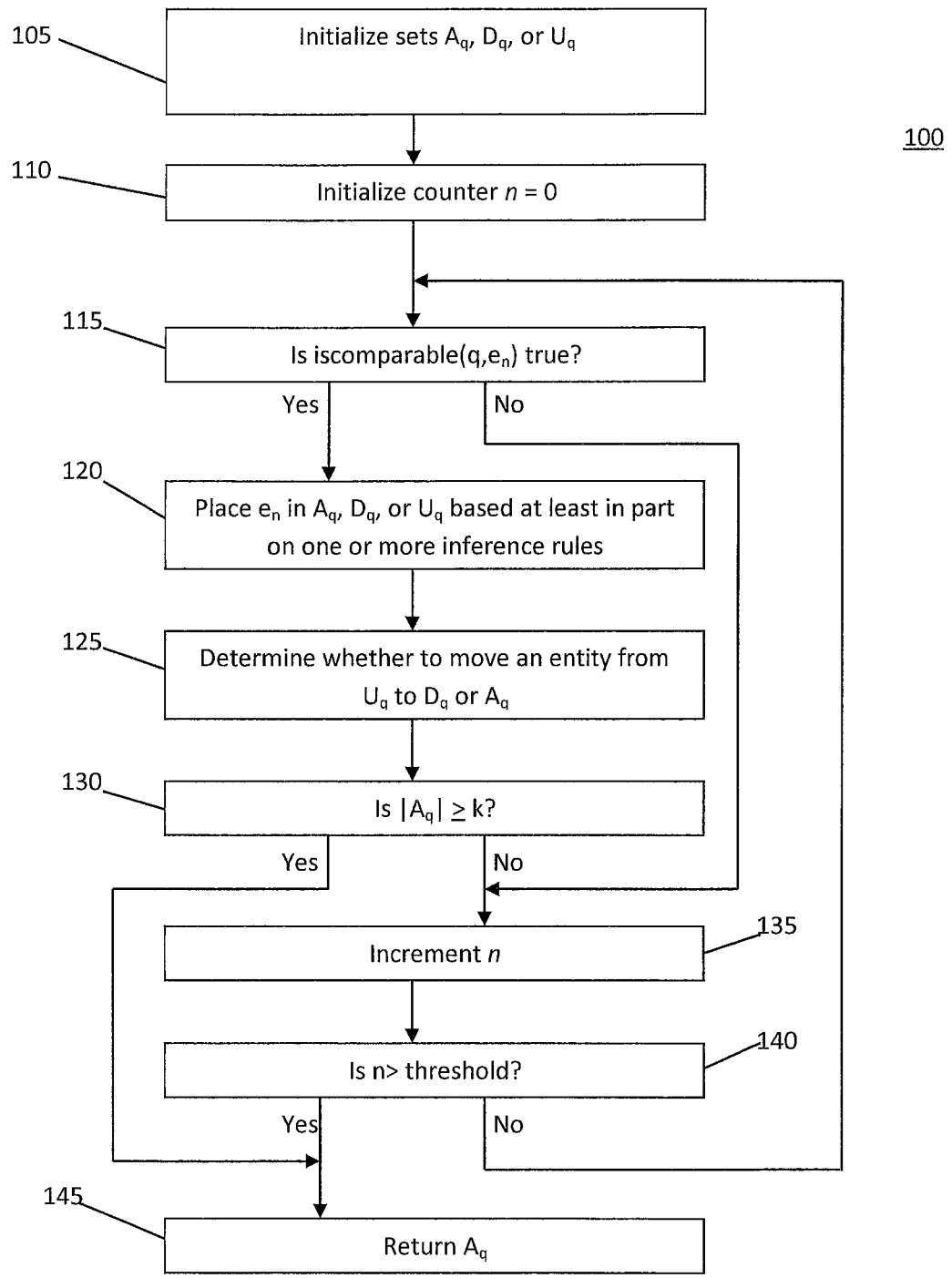
FIG. 1 is a flowchart of a method for generating query-releated suggestions according to one embodiment.

Reference throughout this specification to "one example", "one feature", "an example", or "a feature" means that a particular feature, structure, or characteristic described in connection with the feature or example is included in at least one feature or example of claimed subject matter. Thus, appearances of the phrase "in one example", "an example", "in one feature" or "a feature" in various places throughout this specification are not necessarily all referring to the same feature or example. Furthermore, particular features, structures, or characteristics may be combined in one or more examples or features.

Services or capabilities of the Internet may be designed or employed to collect or disseminate content. For example, web sites or services may enable one to transfer content to those interested in acquiring it. For example, web pages, blog entries, comments, emails, or combinations thereof, etc. are capable of being created and/or likewise accessed by others. Content may be accessible via the Internet via any of a number of different mechanisms. By way of example only, one may subscribe to really simple syndication (RSS) streams, join social networks, or use search engines. However, mechanisms are not generally available so that available content may generally be sufficiently exploited, especially given the volume available and few approaches for identifying more useful content.

Search engines continue to be employed in connection with research-oriented task such as, for example, identifying, comparing or selecting products, travel destinations, or restaurants, for example. A "research-oriented task," as used herein may refer to a task performed to locate an entity or item of interest. For example, one or more research-oriented tasks may comprise providing one or more search queries to a search engine to locate an item. For example, if a user is attempting to locate an inexpensive restaurant serving pizza in a particular neighborhood, the user may submit one or more search queries to a search engine to locate one or more restaurants serving pizza in or near a particular neighborhood. A user may additionally search for user reviews or ratings for a restaurant, for example.

A database, such as DBpedia™, for example, may be utilized to describe one or more entities. An entity here refers to an item or topic of interest. Therefore, identifying one or more entities may be useful or desirable in connection with providing relevant suggestions for a query, for example. A database, such as DBpedia™, for example, may include content arrange in a structured or semi-structured manner. This sort of organization or arrangement of content may make locating content of interest less burdensome.

An implementation of a method or system, as discussed herein, may for example identify one or more entities relating to a search query that may be employed as a suggestion. In this context, the term entity refers to a discretely identifiable item of interest. Generating query-related suggestions may be characterized as, for example, given a search query expressing interest in a entity, how to identify a number (e.g., k, where k comprises a positive integer) of suggestions containing alternatives to the entity in a manner so that those identified are more likely to be useful or desirable. It is noted that restricting a number of suggestions may be useful or relevant in a number of situations, such as small screens or displays as may be the case for smart phones, tablets, internet appliances, small laptops, PDAs and the like. Likewise, on a larger display, multiple windows may be open so that a limited or restricted number of suggestions may remain useful or desirable. An entity may be associated with one or more values, ratings, or measurements. For example, if an entity comprises a name of a restaurant, additional associated content may include, for example, a location of the restaurant, user ratings, price content or content describing a type of food available at the restaurant.

In one example implementation, factors that may be considered to determine or identify more useful or more desirable suggestions out of a set of possible suggestions may include: (a) a set of entities comparable (e.g., alternative options) for a given query; or (b) dominance relationships representing or capturing a relative scope of possible entities based at least in part on various attributes, with respect to a given query. A "comparable entity," as used herein may refer to an entity determined to be similar to another entity based at least in part on consideration of one or more attributes associated with the entity. For example, comparable entities for restaurants may be associated with similar values for attributes such as a price range, a type of food available at the restaurants, or a location. A "dominance relationship," as used herein may refer to a relationship between two entities in which one or the entities is associated with greater scope or more likely to generate greater interest, for example. As an illustrative example, in one implementation, if it is known that a user is searching for a name of a coffee shop within a particular neighborhood having a wide selection of coffees, there may be multiple coffee shops from the same franchise, such as Starbucks™, within the neighborhood. Therefore, the Starbucks™ brand may dominate as a suggestion over a suggestion of any particular Starbucks™ coffee shop in the neighborhood.

Accordingly, given a database and (set of) entities as suggestions for a search query, it may be desirable identify k entities within the database that are comparable to the search query and not dominated by any other entity. To this end, in a potential implementation, a database of content may be generated in which one portion of the database captures content related to static dominance relationships, and in which another portion captures query dependent content in a more real-time fashion.

As mentioned previously, search engines may be employed to perform research-oriented tasks, such as identifying, comparing or selecting products, travel destinations, or restaurants, for example. Starting with one seed example (e.g., "Bahamas"), a user may rely on a search session to explore alternatives (e.g., "Hawaii" for travel destinations). A search engine may therefore employ a query suggestion mechanism to provide suggestions for follow-up queries. To allow users to process suggestions effectively, however, the number of suggestions may be restricted. Likewise, in some environments, providing more than a particular number of suggestions may not be physically manageable. For example, mobile devices typically have a size-limited display so that it may not be practical to provide more than a few suggestions. Thus, restricting a number of suggestions may be useful or relevant in a number of situations, such as small screens or displays as may be the case for smart phones, tablets, internet appliances, small laptops, PDAs and the like. Likewise, on a larger display, multiple windows may be open so that a limited or restricted number of suggestions may remain useful or desirable. Thus, given a query q, a query suggestion layer or query suggestion generation mechanism may identify k suggestions for q so that those suggestions are more likely to be useful or desirable in comparison with the alternatives.

Given availability of resources such as Wikipedia™ and DBpedia™, applications may advantageous make use of available collections of structured or semi-structured content. Structured or semi-structured content may comprise attributes for one or more available entities. For instance, by using Wikipedia™, one may compile a list of baseball players along with attributes such as date of birth, height, or career statistics. Similarly, Wikipedia™ may be utilized to locate content relating to a restaurant chain, such as price, or type of food or drinks available, for example.

According to one implementation, a top-k-style query processing architecture may be utilized, such as within a relational database. A user may construct a query to specify constraints that a set of query results or responses may satisfy. For example, a user may submit a search query comprising a location, price, or a type of food available as a query to search for a restaurant.

In one implementation, a user may provide a direct or indirect instance of an entity of interest and may benefit from a set of query results or responses comprising one or more comparable alternatives. One or more suggestions may be provided such that another suggestion in the set does not supersede it or is not itself superseded—e.g., it may be desirable for the set to include suggestions not dominated by another suggestion in the set if viewed in accordance with multiple attributes, for example. Non-dominance in a set of suggestions may contribute to diversity in a resulting suggestion set, to thereby provide a more varied set of related choices compared with a situation in which dominance is present. A "diverse suggestion set," as used herein may refer to a suggestion set in which suggestions in the set are not dominated by another suggestion in the set if considered with respect to multiple attributes, for example. A suggestion set lacking diversity, on the other hand, may identify or return k related suggestions which may include duplicate or similar suggestions, such as multiple Starbucks™ coffee shops within a particular neighborhood, as an illustrative example.

According to one example embodiment, a search query such as "Fazoli's near Palo Alto," may relate to a search of Italian restaurants for which k=2 suggestions may be identified. For example, a relation corresponding to a query may comprise four "tuples" or attributes, which as an illustrative example, may include: an identifier (id), name, location, rating, cuisine, or price. Table A shown below illustrates distance in place of location, which may be computed in a query-dependent manner, as described in more detail, based at least in part on a location (e.g., Palo Alto) specified within a search query, for example. If a location is not specified in a search query, on the other hand, a location of a user may be determined in various approaches, such as based at least in part on an IP address, a location associated with a user profile for a user or in accordance with GPS, to provide a few possible examples.

Given four tuples as shown in Table A, tuple $t_4$ may be determined to be incomparable to a query, for example. For example, tuple $t_4$ for "Taco Bell" may be incomparable based at least in part on a difference in a cuisine type or a price range specified in a query. After eliminating t4, it may be observed that tuples $t_1$ and $t_2$ are more likely to be viewed as "superior" to tuple $t_3$. For example, it may be wasteful to show tuple $t_3$ to a user if it is determined that the user is likely to eliminate "Sphaggetti Factory" for tuple $t_3$ in favor of "Oliver Garden" for tuple $t_1$ or "Tomatino" for tuple $t_2$. Thus, tuples $t_1$ and $t_2$ may dominate tuple $t_3$. In this context, the term tuple refers to a set of attributes, such as four in this example, other than name or other identifier, corresponding to a named entity. Accordingly, suggestions to a user may, for example, comprise those of tuples $t_1$ and $t_2$, for this simplified example.

TABLE A

| id | Name | Distance | Rating | Cuisine | Price |
|---|---|---|---|---|---|
| $t_1$: | Olive Garden | 1.0 | 3.5* | {Italian} | $40 |
| $t_2$: | Tomatino | 0.8 | 5.0* | {Italian} | $40 |
| $t_3$: | Sphaggetti Factory | 0.8* | 2.0 | {Italian} | $40 |
| $t_4$: | Taco Bell | 1.0 | 4.0* | {Fast-food} | $20 |

Query processes in an example embodiment may interleave subroutine or similar operation-type calls to compute comparability or dominance between entities, as described in more detail later. Likewise, in an example embodiment, one or more pruning rules may be implemented to allow for early termination of a results search or to re-use previous results or responses to other related or similar queries. Examples that are illustrative are discussed below; however, claimed subject matter is not limited in scope to examples provided for purposes of illustration.

In one embodiment, a relation R may be characterized over a set A(R) of attributes. A tuple $t \in R$ may characterize an entity where an attribute $a_i \in A(R)$ is drawn from domain $dom(a_i)$ of $a_i$ and may include an additional special value null. A value for an attribute $a_i$ may, for example, comprise: (a) a single value drawn from a domain $D_i$; (b) a set of values drawn from $D_i$; or (c) a numerical range.

Table A illustrates an example relation R comprising attributes such as location, rating, cuisine, or price for restaurants. "Location" may comprise a name of a location or geographical area where a restaurant is located. "Rating" may comprise a value within a range from 0 to 5 or some other defined range, for example. "Cuisine" may comprise a set of string values for different cuisines served at a restaurant. "Price" may comprise a single numeric or a range of numeric values. Likewise, name may also comprise an attribute. For example, "name" may comprise a name of a restaurant. Of course, that additional or different attributes, such as may be of interest as useful or desirable, for example, may be included within a particular relation and that this is merely a simplified example for illustration purposes primarily.

In general, in an embodiment, for example, attributes A(R) for R may be split into two sets intended to be disjoint or nearly so, for example, such as (a) query-independent attributes for which values are largely static across different queries; and (b) query-dependent attributes for which values may vary or may depend at least in part with query specifics. Price and rating, for example, may comprise examples of query-independent attributes that may be static largely independent of a particular search query. Location, on the other hand, may comprise an example of a query-dependent attribute.

Therefore, for an embodiment, tuples may be identified from relation R that may be comparable to a search query and/or may dominate tuples not included within a set of k query suggestions, for example. A comparability operation, for example, in an embodiment, may be utilized to identify comparable entities. A comparable operation may be based at least in part on comparisons of individual attributes, for example.

For example, in an embodiment, a relation R may comprise entities $e_1$ and $e_2$ in a particular example. A comparability operation, denoted, for example, as is comparable(q, e) may return a Boolean value indicating whether entities $e_1$ and $e_2$ are comparable in one embodiment. However, in an alternate embodiment, a comparability operation may generate a score to indicate a measure of strength of comparability between two entities. Likewise, in an embodiment, a comparability operation may be mapped into a Boolean operation based at least in part on use of a threshold comparability score to distinguish comparable entities from incomparable entities.

A domination relationship for entities may be characterized over a subset of possible attributes, referred to herein as "d-attributes," for an example embodiment. For example, names of restaurants or a type of cuisine served at the restaurants may not satisfy a domination relationship. D-attributes may comprise one or more sets of values from an at least partially ordered set, in an embodiment, for example.

For a d-attribute A and two values $a_1, a_2 \in dom(A)$, dominance may be characterized as satisfying one of the following: (a) $a_1 >_D a_2$ (or $a_2 >_D a_1$), intuitively meaning the value $a_1$ (or $a_2$, respectively) is "better" than the value $a_2$ (or $a_1$, respectively); (b) $a_1 =_D a_2$, intuitively meaning $a_1$ and $a_2$ are considered to be at least roughly or approximate equally satisfactory; or (c) $a_1 \neq_D a_2$, intuitively meaning $a_1$ and $a_2$ are incomparable values. "$_D$" as used herein may indicate a dominance relation. In this context, "better" is intended to indicate that one is more likely to be viewed as better by a substantial portion of users, for example.

For example, as an illustration, for a rating attribute shown above in Table A, 5*>D 3.5*. For a price attribute, $18 $>_D$ $20, for example. If half-star differences in ratings are viewed as negligible or nearly so, for example, 4*$=_D$ 3:5*. For a cuisine attribute, American$\neq_D$ {Italian, Pizza}, and a price $10-15 6$\neq_D$ $12-25.

Entity domination may occur if an entity dominates another entity over a plurality of attributes. For example, given two entities $e_1$ and $e_2$ with a set of corresponding attributes, $e_1 \succ e_2$ if:

(a) $\forall$ d-attributes A: $e_1.A >_D e_2.A$ or $e_1.A =_D e_2.A$ (b) $\exists$ d-attribute A such that $e_1.A >_D e_2.A$ A restaurant $e_1$ may dominate restaurant $e_2$ if the rating of restaurant $e_1$ is "5*", the rating of restaurant $e_2$ is "2*", and other attributes for restaurants $e_1$ and $e_2$ are roughly equivalent.

Given a search query, a relational query process according to one embodiment may return a set of result tuples that satisfy constraints specified, for example, in a search query. Given a search query, an at least partially ordered set of results may be generated where a tuple is present in the results set if it is comparable to a search query and is not dominated by another other result tuple of the set, in one embodiment. Tuples in a set, for an embodiment, for example, may be ordered by corresponding comparableness scores.

A point query of a form such as "Pizza Chicago™ in Palo Alto," for example, may be considered in one embodiment. A "point query," as used herein may refer to a search query where a name of a business and a location or area corresponding to the search query is indicated explicitly or implicitly, for example. Results for a point query may, for example, comprise one or more entities that are comparable to a specified search query.

An exploratory query of a form such as "Italian Restaurant in San Francisco," for example, may likewise be considered in one embodiment. An "exploratory query," as used herein may refer to a search query where a business name is not indicated and a location or area corresponding to the search query is indicated explicitly or implicitly, for example. Results for an exploratory query may also, for example, comprise one or more entities that are comparable to a specified search query.

A relation R may describe one or more entities and corresponding attributes and a query q. Query q may comprise a point or exploratory query, for example, for which k tuples are requested. It may be desirable or useful, for example, for an embodiment to process query q so as to return a ranked list of at most k tuples $t \in R$ such that tuples of the ranked list are comparable to tuples associated with q while potentially also accounting for implicit or explicit ordering or preferences of attributes.

Obtaining or providing results or responses to a query may be associated with an execution cost. An execution cost for processing query q may be characterized as a fraction of tuples that are processed from a database so as to obtain or provide results or responses to the query. However, for an embodiment, a query q may be considered to render a modified "view" of a database. Specifically, for example, a result of applying a comparability operation with respect to an attribute value may vary at least partially in accordance with a particular query. This, in turn, may affect a domination relationship between possible or potential points or entities for a query. In a restaurant query, for example, for two tuples $t_1$ and $t_2$, a measure of distance between a user location and a candidate location may result in $t_1 \succ_D t_2$ for some queries, $t_2 \succ_D t_1$ for other queries, and for some queries neither domination relation may be applicable. Simple offline indexing methods may not be sufficient in a query processing scenario such as this, for example. Therefore, it may be desirable or useful for at least some embodiments in accordance with claimed subject matter to have a capability to address such situations.

A query process may provide or result in one or more query-related suggestions. A query or query-related suggestion, in an example embodiment, may be represented such that given a relation R comprising one or more entities, and a single entity e ∈ R, entities e' ∈ R may be found or identified such that ∄ e" ∈ R with $e" \succ_D e'$ for one or more ordered attributes $A_j$, and is comparable(e,e'). A "diverse set" may therefore be selected of comparable entities. A "diverse set," as used herein may refer to a set, such as a suggestion set, in which no entity in the set dominates another entity in the set.

According to one particular embodiment, an approach may comprise retrieving tuples in the relation, finding comparable entities, then computing a "mathematical distance" from them in terms of attributes. However, this process may be computationally expensive to execute in an embodiment. In one embodiment, however, to address computation cost, so to speak, a database D of entities may be searched to process a search query q to generate k suggestions or responses in which database D includes an organization useful for generating suggestions. For example, in an embodiment, an offline database or portion of a database may maintain a domination relationship of entities based at least in part on attributes that are largely query-independent or static. A database D including a suitable organization may be scanned n an order so that computation expensive is addressed at least partially as a result of domination relationships. As database D is scanned, calls, for example, to operations, such as is comparable(q,e) and is dominates($e_1$, $e_2$), or similar operations, may be interleaved to progressively expand identification of potential search query responses or results.

As discussed above, for an example embodiment, is comparable(q,e) or a similar operation refers to an operation capable of indicating whether an entity e is comparable to a query q; similarly, is dominates($e_1$, $e_2$) or a similar operation refers to an operation capable of indicating whether entity $e_1$ dominates entity $e_2$. For example, in an embodiment, an example process may include the following. Entities that are comparable to a search query may be placed in one of the following three lists maintained dynamically:

(1) Set $D_q$ of entities are discarded because as they do not belong in a search query response;
(2) Set $A_q$ of responses include aspects for a search query result or response (e.g., are comparable and not dominated by another comparable entity); or
(3) Set $U_q$ of uncertain entities that do not belong to sets $D_q$ or $A_q$, because additional processing to evaluate them is desirable.

FIG. 1 is a flowchart of an example embodiment 100 of a method or process that may be employed. A set $A_q$ of suggestions for a search query may be produced according to one embodiment, for example. Embodiment 100 is intended to be illustrative. Therefore, embodiments in accordance with claimed subject matter may include all of, less than, or more than blocks 105-145. Also, the order of blocks 105-145 comprises an example order.

At operation 105, sets $A_q$, $D_q$, or $U_q$ may be initialized. At operation 110, counter n may be initialized to a value of 0. At operation 115, a determination may evaluate whether a query q is comparable to entity $e_n$. For example, operation is comparable(q,$e_n$) may be utilized to determine whether query q is comparable to entity $e_n$.

Entities may be processed individually based at least in part on domination relationships maintained, for example, in a database, referred to as a static domination graph, as discussed in further detail below. In this context, employing a database of static domination relationships to identify comparable entities may be referred to as scanning. If a scanned entity e is incomparable to query q, the query may not processed and may not placed in any of the three sets, e.g., set $A_q$, set $D_q$, or set $U_q$. If e is comparable, on the other hand, a set of inference rules may be utilized to determine whether to place scanned entity e in set $A_q$, or whether to discarded scanned entity e. Scanned entity e may be discarded, for example, if scanned entity e is dominated by an existing entity in set $U_q$. If a determination is not made to discard scanned entity e, scanned entity e may be placed in set $U_q$.

If "yes" at operation 115, processing proceeds to operation 120; if "no," on the other hand, processing proceeds to operation 135. As operation 120, entity $e_n$ may be placed into set $A_q$, set $D_q$, or set $U_q$ based at least in part on one or more inference rules, such as inference rules for an example embodiment, as discussed further below. Of course, claimed subject matter is not limited in scope to the details of a particular illustrative embodiment. For example, other embodiments may include other additional rules, some different rules and/or some corresponding rules.

At operation 125 a determination may be made of whether to move an entity from set $U_q$ to set $A_q$ or to set $D_q$. For example, if scanned entity e dominates another entity within set $U_q$, the other entity may be moved to set $D_q$. On the other hand, for example, if potentially dominating entities have been scanned the other entity may be moved to set $A_q$. Inference rules for an example embodiment are discussed in further detail below.

At operation 130, a determination is made of whether a number of entities in set $A_q$>k. K may comprise a threshold number of suggestions, for example, for an embodiment. If "yes," processing proceeds to operation 145; if "no," on the other hand, processing proceeds to operation 135. At operation 135, counter n may be incremented. At operation 140, a determination may be made as to whether n exceeds a threshold, such as a number of entities to be scanned. If "yes" at operation 140, processing proceeds to operation 145; if "no," on the other hand, processing proceeds to operation 115. At operation 145, set $A_q$ may be returned and, for example, may be presented to a user of a search engine in an example embodiment. A method embodiment as shown in FIG. 1 may therefore terminate if k response or results are found or a database has been scanned so that set $A_q$ may be returned. For example, as indicated, set $A_q$ may be presented to a user in an example embodiment.

In accordance with one embodiment, as suggested previously, two types of attribute domination relationships may be identified: query-independent attributes, and query dependent attributes. A query-independent or static attribute may comprise an attribute whose value is primarily or largely not dependent upon a query. A query-dependent or dynamic attribute, on the other hand, may comprise an attribute whose value may change primarily or largely based at least in part on a query.

"Static domination," as used herein, may refer domination of one or more query-independent or static attributes of a set of entities. Given two entities $e_1$ and $e_2$ with a corresponding set of static d-attributes $A_s$ and dynamic d-attributes $A_d$, entity $e_1$ may statically dominate entity $e_2$ (denoted as $e_1 \succ e_2$) if, for example:

1. $\forall$ d-attributes $A \in A_s$: $e_1.A \succ_D e_2.A$ or $e_1.A =_D e_2.A$. [1]

2. $\exists$ d-attribute $A \in A_s$ such that $e_1.A \succ_D e_2.A$. [2]

According to one embodiment, static domination of one entity by another may imply non-existence of a dynamic domination in another direction. Non-existence of dynamic domination in another direction may be utilized for pruning, for example, in one or more embodiments.

In an example embodiment, an inference rule, as discussed below, may be utilized to infer an entity e to be in a set of responses or suggestions if, for example, latent elements are statically dominated by entity e. Given two entities:

$e_1, e_2, (e_1 \succ e_2) \Rightarrow \forall$ queries q: $\neg(e_2 \succ_D e_1)$. [3]

A database, such as a "Static Domination Graph" may be employed to scan entities in a query process to thereby use static domination relationships for an embodiment, as discussed above.

Given a database D of entities with a set $A_s$ of static attributes, a Static Domination Graph may be maintained where Static Domination Graph G=(N,E), where a node may exist in N for one or more entities in D. An edge $(n_1, n_2) \in E$ may imply an existence of a static domination relationship $e_1 \succ e_2$, where $e_1$ or $e_2$ comprise entities within database D corresponding to nodes $n_1$ or $n_2$.

A Static Domination Graph may comprise a directed acyclic graph or DAG that stores content in a manner so that one or static relationships may be inferred between respective pairs of entities, for example. Static domination relationships may be transitive, and therefore, if relationships exist such as $e_1 \in e_2$ or $e_2 \in e_3$, an edge may not need to be maintained from $e_1$ to $e_3$ in a Static Domination Graph, for example. A Static Domination Graph may comprise a reduced DAG in a sense such that an edge depicting a transitive domination relationship may not be present in the Static Domination Graph for some embodiments, for example.

Figure 2:
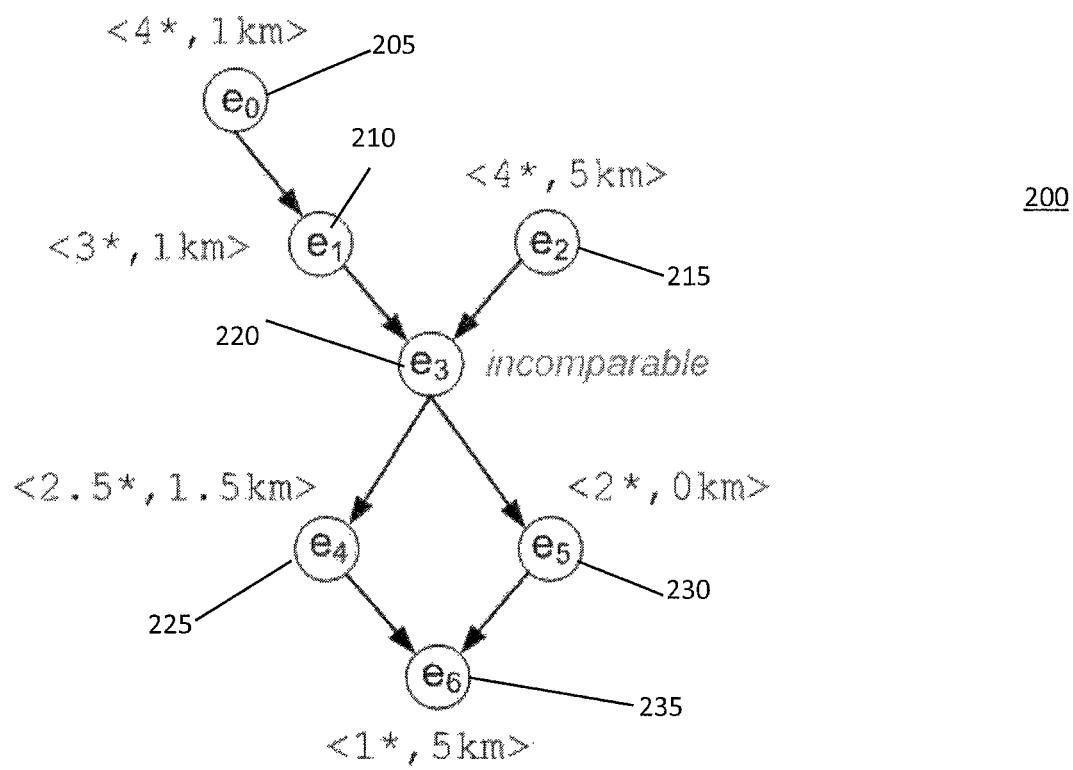
FIG. 2 illustrates a Static Domination Graph according to one implementation.

FIG. 2 illustrates a Static Domination Graph 300 according to one implementation. As shown, Static Domination Graph 200 may illustrate attribute values for various nodes, for example. Generation of one or more Static Domination Graphs 200 may take place for use with one or more queries, for example. In an example embodiment, given an entity e that satisfies a relationship is comparable(q, e), certain criteria or rules may be utilized to determine whether entity e belongs in a set $D_q$, set $A_q$, or set $U_q$, for example. Again, however, these rules are illustrative of an embodiment and are not meant to be limiting. Other embodiments may employ rules other than these, rules in addition to these or some but not all of these rules and other additional rules, for example.

RULE A (Certain)—given a scanned entity e from Static Domination Graph G, if $\exists\ e^* \in (D_q \cup A_q \cup U_q)$ such that $e^* \succ_D e$, then move entity e to set, e.g., $D_q = \{e\} \cup D_q$.

RULE B (Uncertain)—given a scanned entity e from Static Domination Graph G, if Rule A is not resolved with respect to entity e, move entity e to uncertain set, e.g., $U_q = \{e\} \cup U_q$.

Rules A (Certain) and B(Uncertain) discussed above may be utilized to determine where to place a scanned entity e. Additional rules may be utilized to determine whether one or more entities that were previously determined to be uncertain later become certain as more entities are scanned. It should be appreciated that rules as discussed herein are recited in generality. For example, an assumption may include that not all entities within three lists (e.g., $D_q$, $A_q$, or $U_q$) may have been checked for domination previously. In another embodiment, however, one might assume previously scanned entities may have already been checked for domination and, therefore, in such an implementation, discussed below, for example, additional rules may perform domination checks based at least in part on scanned entities in one embodiment, but not otherwise, for example. Moreover, rules as discussed herein need not be performed immediately for an additional or new entity, for example. For efficiency, for example, execution of rules may be batch processed after a set of entities have been scanned. In such an embodiment, for example, scanned entities may be conservatively placed in uncertain set $U_q$ in one embodiment, for example. An additional rule is recited below:

RULE C (Uncertain→Answer)—At a point after scanning a set of entities from the Static Domination Graph G, for an entity $e^* \in U_q$, move e from $U_q$ to $A_q$ $U_q = U_q - \{e^*\}$ and $A_q = A_q \cup \{e^*\}$) if conditions recited below are true:

[Condition 1] No tuple $e \in (U_q \cup A_q \cup D_q)$ satisfies $e^* \succ_D e^*$ 2.

[Condition 2] Un-scanned tuples in Static Domination Graph G are descendants of $e^*$, e.g., there exists a directed path from $e^*$ unscanned nodes n in Static Domination Graph G.

Condition 1 may be utilized to evaluate whether an entity e being moved into set $A_q$ is not being dominated. With a Rule, such as D as recited below, for example, a system may employ processing so that one or more entities in uncertain set $U_q$ may not typically be dominated by scanned entities. That is, risk of this occurring may be reduced from use this or a similar rule.

Condition 2 as recited above may be utilized so that remaining un-scanned entities may be able to dominate $e^*$.

RULE D (Uncertain→Discarded)—Given a Static Domination Graph G, an entity $e^* \in U_q$ may be moved to discarded set (e.g., $D_q = D_q \cup \{e^*\}$ and $A_q = A_q - \{e^*\}$) if $\exists\ e^* \in (U_q \cup A_q \cup D_q)$ where $e \succ_D e^*$.

In one embodiment, as suggested previously, Rule D may be applied new or additional scanned entities. Referring to FIG. 2, a Static Domination Graph 200 is illustrated that shows values of two attributes, e.g., rating and distance. Given Static Domination Graph 200, a process may scan 7 entities (e.g., $e_0$, $e_1$, $e_2$, $e_3$, $e_4$, $e_5$, or $e_6$) in an order such as: $e_0$; $e_2$; $e_1$; $e_3$; $e_4$; $e_5$; $e_6$. This may, for example, use graph relationships for potential efficiency, since $e_2$ scanned before entity $e_t$ for example. After scanning an entity $e_n$ inference rules such as Rules A-D discussed above may be used to determine an appropriate list for entity $e_n$.

Figure 3:
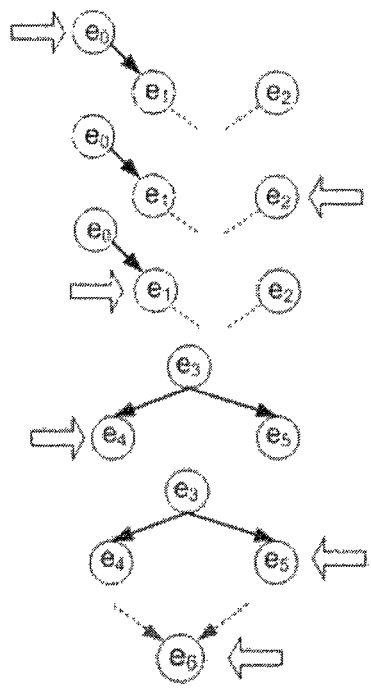
FIG. 3 is a flow chart depicting an implementation of a query process to categorize one or more entities according to an embodiment.

FIG. 3 is a schematic diagram 200 depicting an implementation of a query process to categorize one or more scanned entities according to an embodiment. Embodiment 300 is intended to be illustrative. At operation 305, entity $e_0$ may be placed in set $U_q$. At operation 310, Rule B may be satisfied for entity $e_2$ and thus $e_2$ may be placed in set $D_q$. Resulting from placing $e_2$ in discarded set $D_q$, entity $e_0$ may be moved from set (A, to set $A_q$ based at least in part on satisfaction of Rule D. At operation 315, entity $e_1$ may be placed into set $D_q$ because $e_0 \succ_D e_1$ (Rule D). At operation 320, entity $e_3$ may be discarded because entity $e_3$ does not satisfy is comparable(q, e). At operation 320, entity $e_4$ may be discovered and placed in set $U_q$ because, for example, Rules A-D are not met. At operation 325, entity $e_5$ may be placed in set $D_q$ because entity $e_0 \succ_D e_5$ (e.g., Rule D). At operation 330, entity $e_6$ may be discovered and placed in set $D_q$.

One or more entities e placed in set $U_q$ may be considered to be "uncertain" in that there may be future entities discovered, for example, that result in making a determination to discard entity e or move entity e over to $A_q$. In one embodiment, for example, an set $A_q$ may be re-used for subsequent queries. Queries issued within a given session, such as for a user, may, for example, share similarities with respect to one or more attributes. Accordingly, query results from a query may therefore be re-used in some instances, for example, to generate results for subsequent queries. For example, one or more suggestions determined for query $Q_1$ may subsequently be used in response to processing query $Q_2$ if queries $Q_1$ and $Q_2$ share one or more similar attribute constraints. If queries $Q_1$ and $Q_2$ differ only with respect to one attribute, for example, a determination may be made as to whether to re-use a response tuple for query $Q_1$ for query $Q_2$. In one implementation, for example, a determination to re-use a tuple for different queries may be based at least in part on a particular attribute type that differs between queries. Examples of attribute types that may differ include, for example, price, distance, or cuisine.

In one particular example, queries $Q_1$ and $Q_2$ differ only in price constraints $P_1$ and $P_2$, respectively. Given a tuple $x \in A_1$, where $A_1$ comprises a set of suggestions for query $Q_1$, the following rule may be utilized to determine whether tuple x also belongs to $A_2$, a set for query $Q_2$:

RULE E (PRICE): If $P_2 \leq P_1$, then $x \leq P_2$ is a necessary and sufficient condition.

Figure 4:
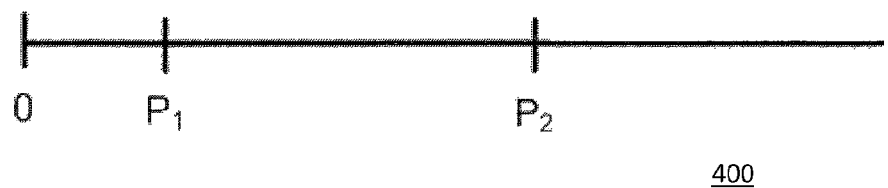
FIG. 4 is a chart showing prices and a tuple for a query according to an embodiment.

FIG. 4 is a chart 400 showing prices $P_1$ and $P_2$ and a tuple x for query $Q_2$ according to an embodiment. In the example shown in chart 400, tuple x has a price attribute that is greater than prices $P_1$ and $P_2$. Accordingly, if tuple x has previously been determined to fall within a set $A_1$ for query $Q_1$, tuple x may likewise fall within set $A_2$ because in this example tuple x is has a price attribute that is greater than $P_2$.

In another example, queries $Q_1$ and $Q_2$ may differ only with respect to distance, denoted as attributes $D_1$ and $D_2$, respectively. For example, a distance metric may be utilized to represent a traveled distance between two points along a path if the path were to follow a grid-like layout. A motivation for selecting a grid-like layout for distance, for example, may be based at least in part on relevance to driving distances which may be implicit in a search query received from a user in a restaurants example. A possible rule for an embodiment to determine whether to re-use a tuple x is set forth below:

RULE F (DISTANCE): Given queries $Q_1$ and $Q_2$ and associated suggestion sets $A_1$ and $A_2$, respectively, where $D_1 = (x_1; y_1)$ and $Q_2 = (x_2; y_2)$, if a tuple $x \in A_1$ with distance $D_3 = (x_3; y_3)$, then $x_3 > x_2$ and $y_3 > y_2$ are necessary and sufficient conditions for x to fall within set $A_2$ for query $Q_2$.

Figure 5:
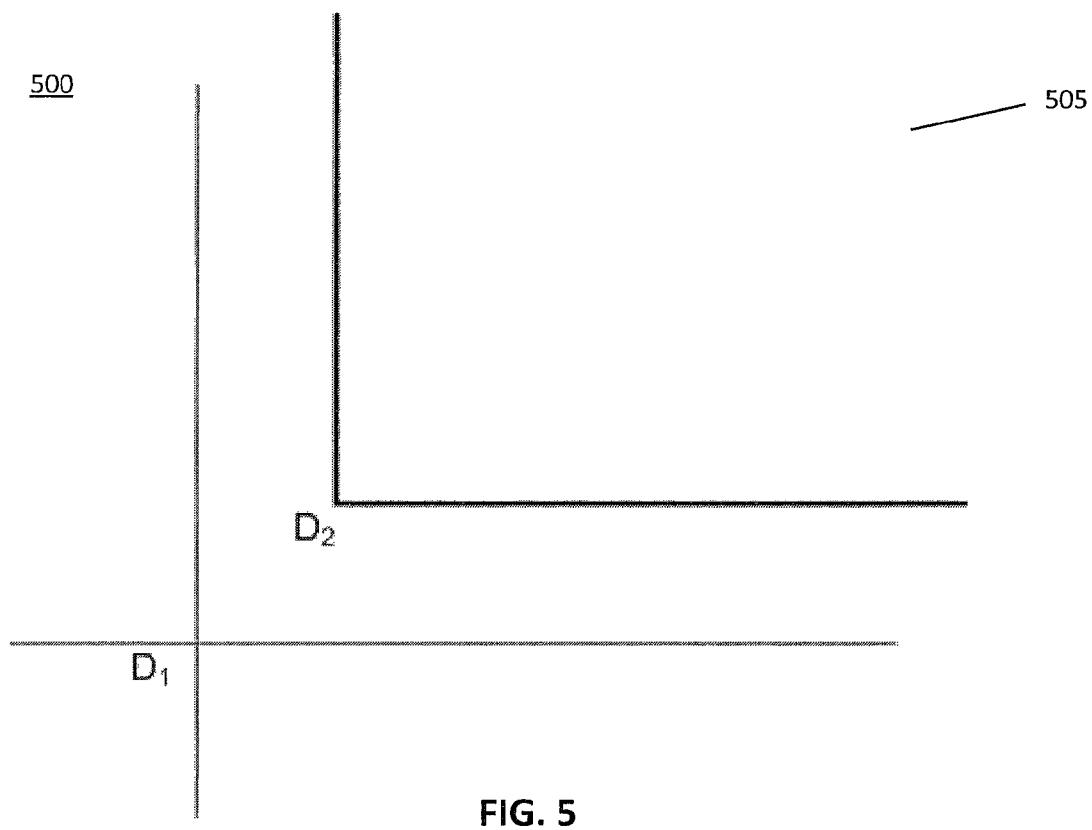
FIG. 5 is a chart showing distances and a tuple for a query according to an embodiment.

FIG. 5 is a chart 500 showing distances $D_1$ and $D_2$ and tuple x for query $Q_2$ according to an embodiment. In the example shown in chart 500, tuple x is determined to fall within set $A_1$ for query $Q_1$. Tuple x may also fall within set $A_2$ for query $A_2$ if tuple x falls within shaded area 505 shown in FIG. 5.

In one implementation a possible choice of a distance metric may comprise Euclidean distance. A Euclidian distance metric may not yield to non-trivial re-use of suggestions, however. For example, rules for points other than those lying on the line joining points $P_1$ and $P_2$ may not be utilized. In one embodiment, two points that are equidistant from $P_1$ may be affected differently by $P_2$, and their respective dominance may be query-dependent.

In one implementation, a cuisine attribute may comprise an attribute differing between queries $Q_1$ and $Q_2$. To compare tuples attributes for dominance, a domination metric based at least in part on an intersection of these sets with respect to a query may be formulated. For example, $C_1 \succ_Q C_2 \leftrightarrow |C_1 \cap Q| > |C_2 \cap Q|$.

It should be appreciated that in some embodiments, multiple suggestions may be combined. For example, suggestions may be reduced by considering a conjunction of dominance over attributes. In one embodiment, for example, an entity X may dominate an entity Y if a domination relationship is true for attributes of entities X and Y. In one example, query responses or results in a sequence of transformations (e.g., from $Q_1$ to $Q_2$ to $Q_3$) may be re-used, where a transformation applies a single-attribute technique, for example.

Query suggestion may be applicable in various domains such as product recommendations for a website of online merchant or a movie recommendation for an online movie website, for example. A recommendation engine may utilize one or more techniques such as collaborative filtering, data mining, or machine learning, for example. Diversity in recommendations may be introduced by considering attribute dominance, as discussed above. It may, for example, be desirable in an embodiment to enable users to explore a set of alternatives such that one alternative is not dominated by another alternative in corresponding attributes.

Web search diversification may focus on providing search results that balance query relevance with result heterogeneity, which may be achieved, for example, by using unstructured attributes, such as intents, topics, or facets, in some embodiments. As discussed herein, suggestion set diversity may be achieved by using structured or semi-structured content and accounting for query-specific attribute dominance. A challenge is that of handling dynamic attribute relationships: e.g., a dominance relationship on a "distance" attribute may become inverted based at least in part on a search query. Moreover, static attributes may be unordered or partially ordered (e.g., a "cuisine" attribute).

In one particular implementation, semi-structured or structured content may be utilized to introduce diversity among ranked results. For example, a result set may be clustered based at least in part on attribute values without necessarily considering overall entity-level dominance. In contrast, an embodiment as discussed above may select a diverse result set, which may be akin to picking a representative non-dominated entity from various clusters.

In an example embodiment, an server or server system may be in communication with client resources, such as a computing platform, via a communication network. A communication network may comprise one or more wireless or wired networks, or any combination thereof. Examples of communication networks may include, but are not limited to, a Wi-Fi network, a Wi-MAX network, the Internet, the web, a local area network (LAN), a wide area network (WAN), a telephone network, or any combination thereof, etc.

A server or server system, for example, may operatively coupled to network resources or to a communications network, for example. An end user, for example, may communicate with a server system, such as via a communications network, using, e.g., client resources, such as a computing platform. For example, a user may wish to search for or otherwise access one or more web documents related to a category of objects.

For instance, for example, fa user may send a query request. A request may be transmitted using client resources, such as a computing platform, as signals via a communications network. Client resources, for example, may comprise a personal computer or other portable device (e.g., a laptop, a desktop, a netbook, a tablet or slate computer, etc.), a personal digital assistant (PDA), a so-called smart phone with access to the Internet, a gaming machine (e.g., a console, a hand-held, etc.), a mobile communication device, an entertainment appliance (e.g., a television, a set-top box, an e-book reader, etc.), or any combination thereof, etc., just to name a few examples. A server or server system may receive, via a communications network, signals representing a request that relates to a query. A server or server system may initiate transmission of signals to provide query related suggestions, for example.

Client resources may include a browser. A browser may be utilized to, e.g., view or otherwise access web documents from the Internet, for example. A browser may comprise a standalone application, or an application that is embedded in or forms at least part of another program or operating system, etc. Client resources may also include or present a graphical user interface. An interface, such as GUI, may include, for example, an electronic display screen or various input or output devices. Input devices may include, for example, a microphone, a mouse, a keyboard, a pointing device, a touch screen, a gesture recognition system (e.g., a camera or other sensor), or any combinations thereof, etc., just to name a few examples. Output devices may include, for example, a display screen, speakers, tactile feedback/output systems, or any combination thereof, etc., just to name a few examples. In an example embodiment, a user may submit a query via an interface, although claimed subject matter is not limited in scope in this respect. Signals may be transmitted via client resources to a server system via a communications network, for example. A variety of approaches are possible and claimed subject matter is intended to cover such approaches.

Figure 6:
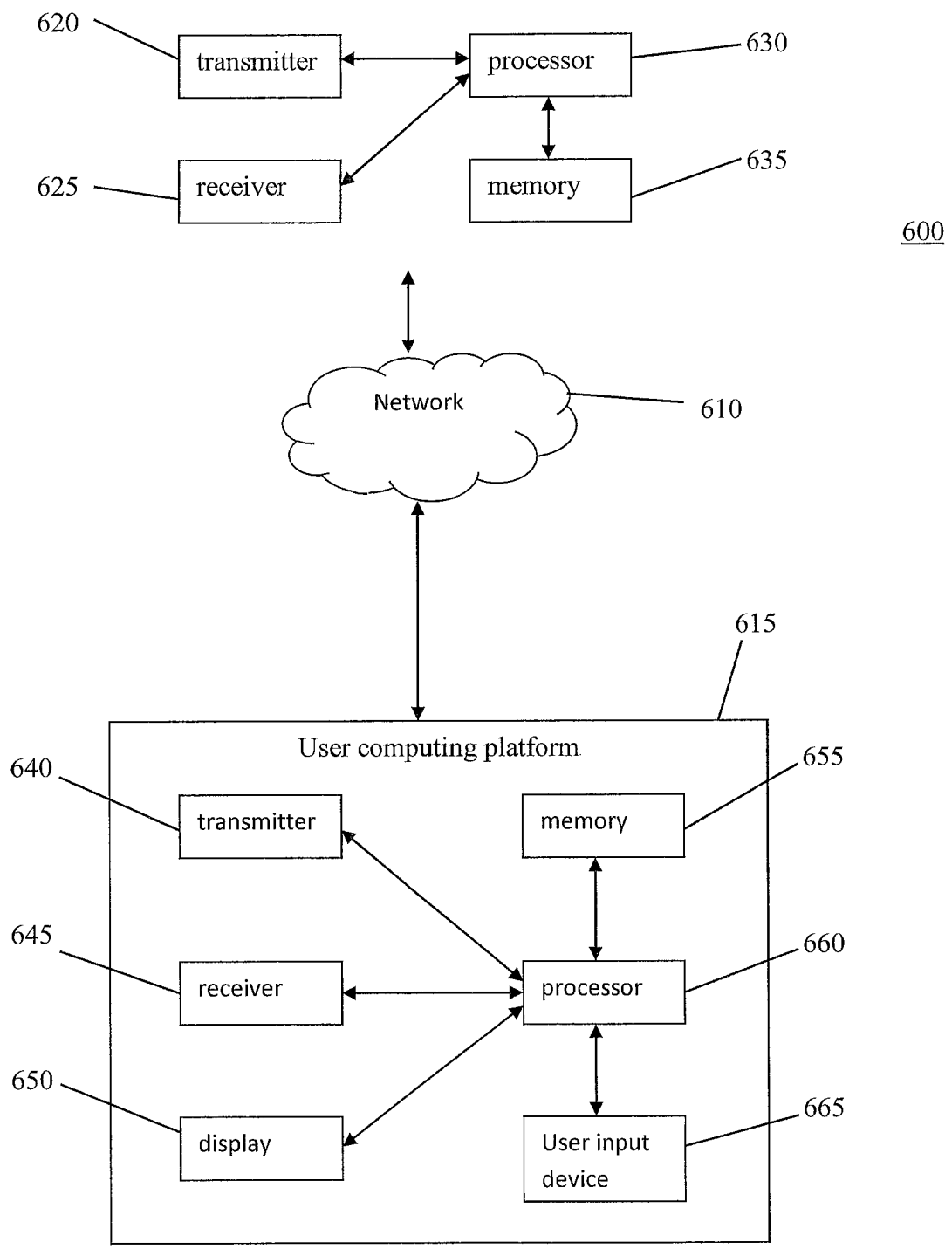
FIG. 6 is a schematic diagram illustrating a computing environment that may include one or more devices according to one implementation.

FIG. 6 is a schematic diagram illustrating a computing environment system 600 that may include one or more devices to display web browser information according to one implementation. System 600 may include, for example, a first device 602 and a second device 604, which may be operatively coupled together through a network 608.

First device 602 and second device 604, as shown in FIG. 6, may be representative of any device, appliance or machine that may be configurable to exchange signals over network 608. First device 602 may be adapted to receive a user input signal from a program developer, for example. First device 602 may comprise a server capable of transmitting one or more quick links to second device 604. By way of example but not limitation, first device 602 or second device 604 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or storage service provider/system, a network service provider/system, an Internet or intranet service provider/system, a portal or search engine service provider/system, a wireless communication service provider/system; or any combination thereof.

Similarly, network 608, as shown in FIG. 6, is representative of one or more communication links, processes, or resources to support exchange of signals between first device 602 and second device 604. By way of example but not limitation, network 608 may include wireless or wired communication links, telephone or telecommunications systems, buses or channels, optical fibers, terrestrial or satellite resources, local area networks, wide area networks, intranets, the Internet, routers or switches, and the like, or any combination thereof. It is recognized that all or part of the various devices and networks shown in system 600, and the processes and methods as further described herein, may be implemented using or otherwise include hardware, firmware, software, or any combination thereof (other than software per se).

Thus, by way of example but not limitation, second device 604 may include at least one processing unit 620 that is operatively coupled to a memory 622 through a bus 628. Processing unit 620 is representative of one or more circuits to perform at least a portion of a computing procedure or process. By way of example but not limitation, processing unit 620 may include one or more processors, controllers, microprocessors, microcontrollers, application specific integrated circuits, digital signal processors, programmable logic devices, field programmable gate arrays, and the like, or any combination thereof.

Memory 622 is representative of any storage mechanism. Memory 622 may include, for example, a primary memory 624 or a secondary memory 626. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory or one or more storage devices or systems, such as, for example, a disk drive, an optical disc drive, a tape drive, a solid state memory drive, etc. In certain implementations, secondary memory 626 may be operatively receptive of, or otherwise able to couple to, a computer-readable medium 632. Computer-readable medium 632 may include, for example, any medium that can carry or make accessible data signals, code or instructions for one or more of the devices in system 600.

Second device 604 may include, for example, a communication interface 630 that provides for or otherwise supports operative coupling of second device 604 to at least network 608. By way of example but not limitation, communication interface 630 may include a network interface device or card, a modem, a router, a switch, a transceiver, or the like.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While certain techniques have been described and shown herein using various methods and systems, it should be understood by those skilled in the art that various other modifications may be made, or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to particular examples disclosed, but that claimed subject matter may also include all implementations falling within the scope of the appended claims, or equivalents thereof.

What is claimed is:

1. A method comprising:
   determining a first grouping of entities of a plurality of entities based at least in part on one or more first dominance relationships between pairs of entities associated with a plurality of query-independent attribute values;
   in response to processing a search query,
      identifying two or more entities from the first grouping that are comparable to the search query, the two or more entities being identified as being comparable at least partially in response to determining that comparability values between pairs of the two or more entities have at least a threshold value of comparability;
      determining one or more second dominance relationships between the pairs of the two or more entities based at least in part on at least one query-dependent value of the two or more entities; and
      determining a suggestion set comprising a subset of the two or more entities, the suggestion set comprising one or more identified entities not dominated by another entity of the two or more entities based at least in part on the one or more second dominance relationships and based at least in part on one or more inference rules indicative of an existence of one or more static domination relationships between attributes of the plurality of entities, wherein a first entity of the two or more entities is capable of being determined not to dominate a second entity of the two or more entities at least partially in response to a determination that individual first attribute values of at least two of the attributes of the first entity are not indicative of a greater scope of interest than corresponding individual second attribute values of the at least two of the attributes of the second entity.

2. The method of claim 1, further comprising transmitting the suggestion set.

3. The method of claim 2, wherein the suggestion set comprises a specified number of query suggestions.

4. The method of claim 1, further comprising classifying one or more of the two or more entities as being within the suggestion set, an uncertain set, or a discard set based at least in part on the one or more attribute values.

5. The method of claim 1, further comprising re-using one or more entities of the suggestion set at least partially in response to processing a second search query based at least in part on the one or more attribute values of the suggestion set being within an attribute value range specified in the second search query.

6. The method of claim 1, further comprising determining at least one of the two or more attributes from a semi-structured or structured database.

7. An apparatus, comprising: a computing platform to:
   determine a first group of result tuples to be based at least in part on one or more first dominance relationships between pairs of result tuples to be associated with a plurality of query-independent attribute values;
   in response to initiation of processing of a search query, identify two or more result tuples from the first group to be comparable to one or more tuples for the search query the two or more result tuples are to be identified as comparable at least partially in response to a determination that comparability values between pairs of the two or more result tuples to have at least a threshold value of comparability;
   determine one or more second dominance relationships between the pairs of the two or more result tuples to be based at least in part on at least one query-dependent value of the two or more result tuples; and
   determine a suggestion set to comprise a set of the two or more result tuples, the set of the two or more result tuples to comprise one or more result tuples to be determined to not be dominated by another of the result tuples to be based at least in part on the one or more second dominance relationships and to be further based at least in part on one or more inference rules to be indicative of an existence of one or more static domination relationships between attributes of the plurality of entities, wherein a first tuple of the two or more result tuples is to be determined not to dominate a second tuple of the two or more result tuples at least partially in response to a determination that query-dependent individual first attribute values of at least two of the attributes of the first tuple to not indicate the greater scope of interest than query-dependent individual second attribute values of the at least two of the attributes of the second tuple.

8. The apparatus of claim 7, wherein the computing platform to comprise one or more servers.

9. The apparatus of claim 7, wherein the suggestions set to comprise a specified number of query suggestions.

10. The apparatus of claim 7, wherein the computing platform to classify one or more of the two or more result tuples within the suggestion set, an uncertain set, or a discard set to be based at least in part on the attribute values.

11. A method comprising:
receiving a suggestion set at a mobile device, the suggestion set comprising a subset of two or more entities comparable to a search query and not dominated by another entity of the two or more entities based at least in part on:
a plurality of attribute values of corresponding attributes and on one or more determined dominance relationships between pairs of the two or more entities based at least in part on separate consideration of query-independent and query-dependent attribute values, and
one or more inference rules indicative of an existence of one or more static domination relationships between attributes of the plurality of entities;
wherein the two or more entities are capable of being identified as being comparable at least partially in response to determining that comparability values between the pairs of the two or more entities have at least a threshold value of comparability, and wherein a first entity of the two or more entities is capable of being determined not to dominate a second entity of the two or more entities at least partially in response to a determination that individual first attribute values of at least two of the attributes of the first entity are not indicative of a greater scope of interest than corresponding query-dependent individual second attribute values of the at least two of the attributes of the second entity.

12. The method of claim 11, wherein the mobile device comprises a client device.

13. The method of claim 11, further comprising presenting the suggestion set via the mobile device.

14. The method of claim 13, wherein the suggestion set comprises a specified number of query suggestions.

15. The method of claim 11, wherein at least one of the two or more attributes having been determined from a semi-structured or structured database.

16. The method of claim 11, wherein the suggestion set comprises a specified number of query suggestions.

* * * * *